United States Patent [19]

Maeda et al.

[11] 3,999,847
[45] Dec. 28, 1976

[54] CARRIER APPARATUS FOR MICROFILM

[75] Inventors: Masahiro Maeda; Masakazu Kagawa, both of Toyokawa, Japan

[73] Assignee: Minolta Camera Kabushiki Kaisha, Osaka, Japan

[22] Filed: Aug. 8, 1975

[21] Appl. No.: 603,093

[30] Foreign Application Priority Data

Aug. 28, 1974 Japan .................... 49-103479[U]

[52] U.S. Cl. ............................................ 353/27 R
[51] Int. Cl.$^2$ ...................................... G03B 23/08
[58] Field of Search .......... 353/27 R, 27 A; 33/1 M

[56] References Cited
UNITED STATES PATENTS

| | | | |
|---|---|---|---|
| 2,701,176 | 2/1955 | Baumgard | 33/1 M |
| 3,744,891 | 7/1973 | Dennis et al. | 353/27 A |
| 3,790,266 | 2/1974 | Ueda et al. | 353/27 R |
| 3,834,800 | 9/1974 | Brownscombe | 353/27 |
| 3,836,242 | 9/1974 | Kluver et al. | 353/27 R |
| 3,869,201 | 3/1975 | Lysle | 353/27 R |

*Primary Examiner*—Steven L. Stephan
*Attorney, Agent, or Firm*—Watson, Cole, Grindle & Watson

[57] ABSTRACT

Carrier apparatus retains sheet-like microfilm to be positioned in an apparatus for projecting images for either viewing or copying. The carrier is moved in first and second orthogonal directions such that the microfilm can be positioned to align a specific frame at a projection station. The carrier is mounted on a support which includes a pair of spaced guide members along at least one of the directions and means mounted between the guide members in contacting relationship therewith. Each pair of guide members and the structure therebetween forms point contact support such that the carrier may be moved smoothly for accurate positioning of the microfilm for alignment of a specific frame thereon. In one embodiment the guide members each include a V-shaped groove and the structure therebetween includes a plurality of rollers mounted in point contacting relationship in the V-shaped grooves. In a modified embodiment each of the guide members consists of a roller and the structure therebetween includes a rail member having V-shaped grooves on each of the surfaces thereof facing the rollers. In a further modification of the carrier supporting apparatus, each of the guide members is a roller having a groove along its outer circumference and a rail is mounted therebetween to engage each grooved surface of each pair of guide members.

4 Claims, 10 Drawing Figures

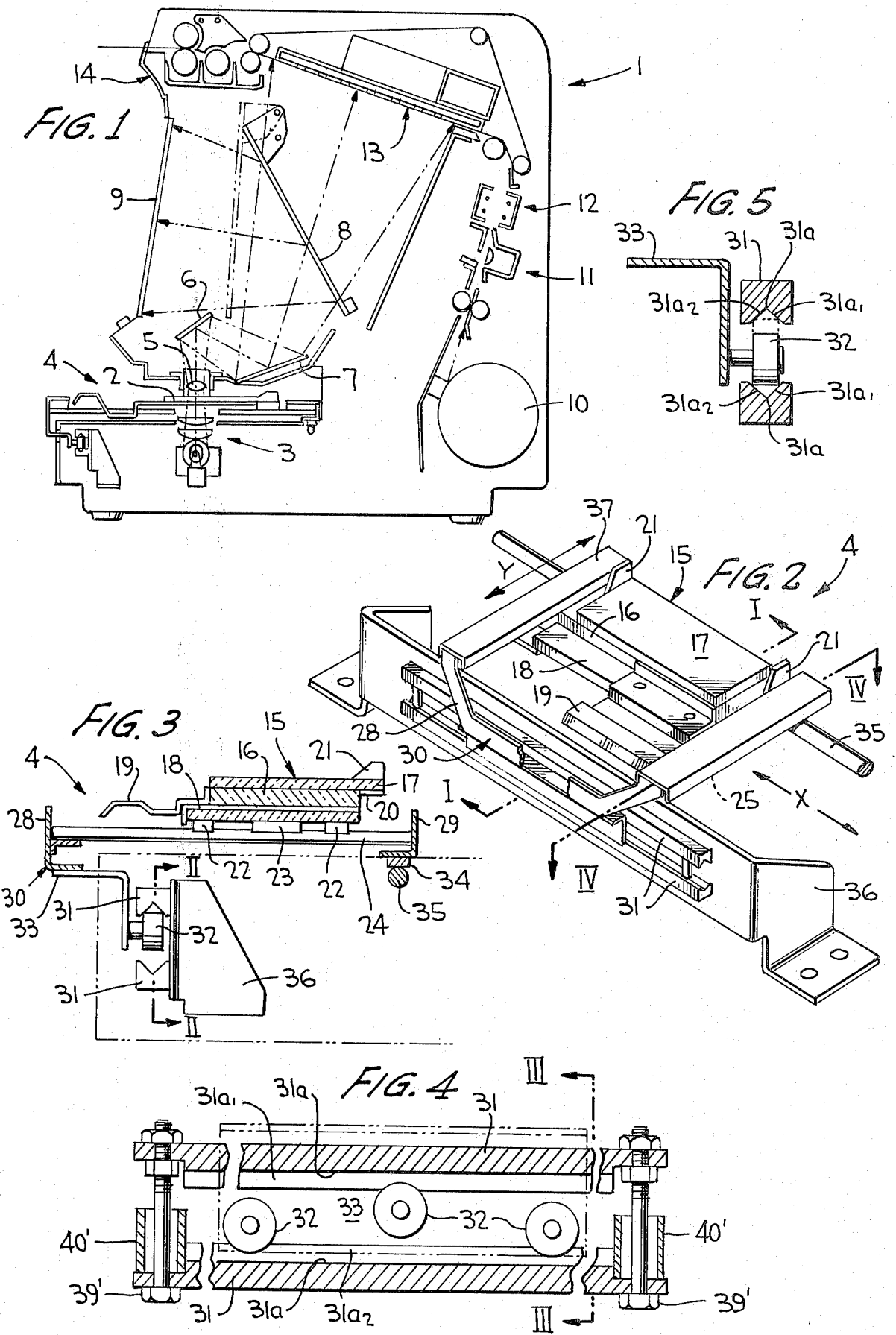

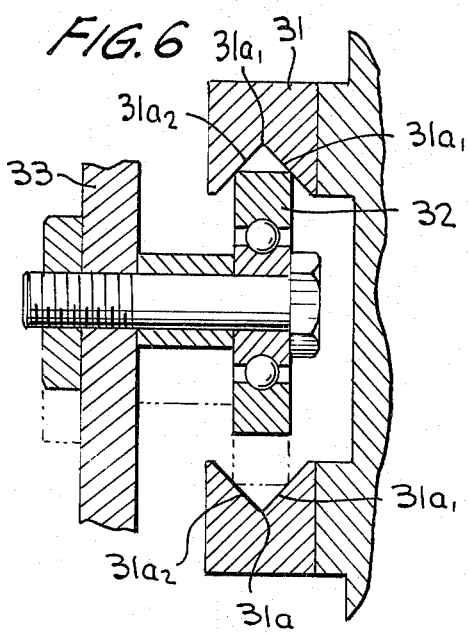
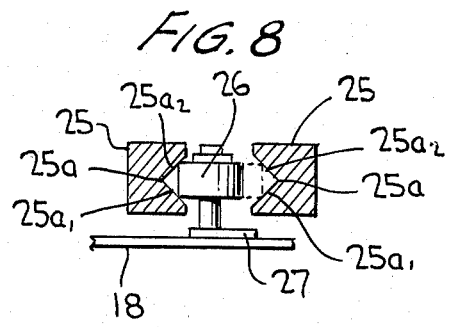
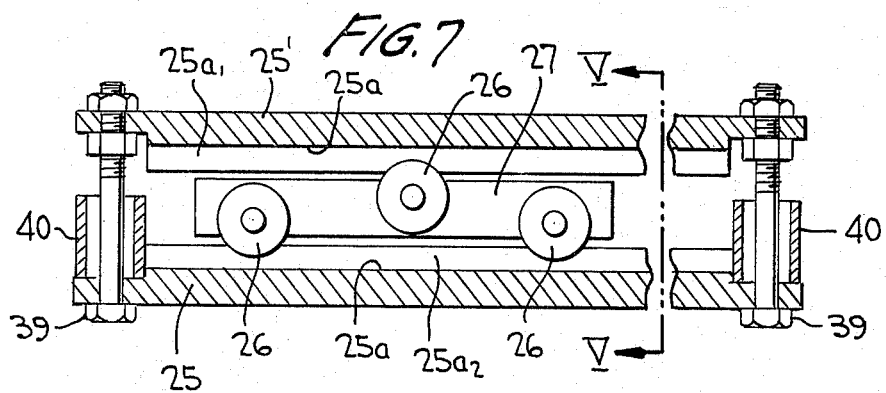
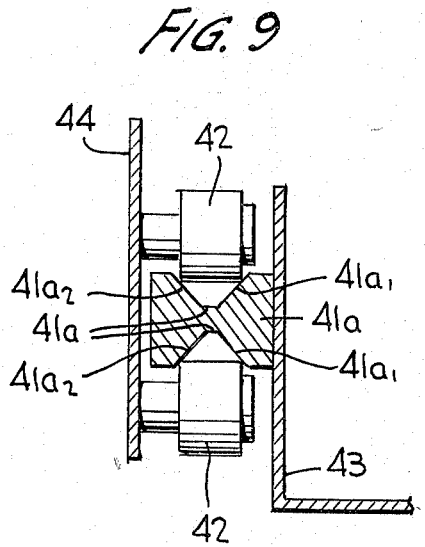
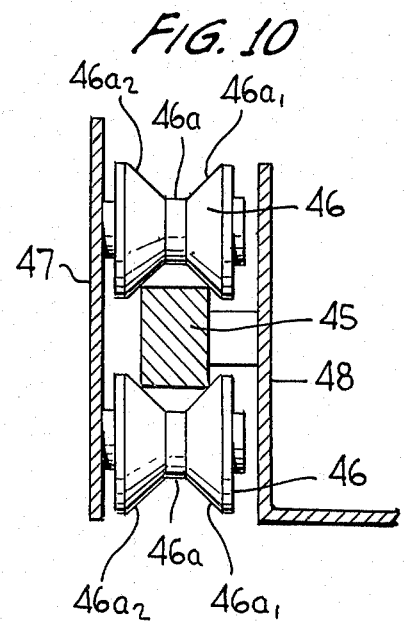

CARRIER APPARATUS FOR MICROFILM

BACKGROUND OF THE INVENTION

1. Field of the Invention

This invention relates to carrier apparatus for retaining and positioning sheet-like microfilm in viewcopier apparatus.

2. Description of the Prior Art

In general, in microfilm viewer or viewer-copier and the like apparatus, the microfilm is customarily illuminated by a light source, so that images recorded on the film are enlarged and projected onto a screen or a photosensitive member through a projecting lens.

Further, microfilm may be classified as either rolled film type, in which the frames carrying images thereon are arranged linearly, or sheet film type, in which the frames carrying images thereon are arranged two-dimensionally. Sheet type microfilm dictates the use of a carrier apparatus which moves two-dimensionally, with the microfilm sheets held flatwise, to bring a specific frame carrying a desired image thereon into a projecting position.

Such carrier apparatus consists of a moving body which moves the film and guide members which guide the aforesaid moving body. In the case of document-support moving type electrophotographic reproducing apparatus, there are interposed ball bearings or bearings between the moving body and the guide members to provide smooth movement for the moving body. However, with ball bearings inserted between the moving body and the guide members, the ball bearings also move due to the movement of the moving body, and irregular movement of the ball bearings results. The irregular movement of the ball bearings causes looseness between the moving body and the guide members, or hinders the smooth movement of the moving body. But with bearings interposed between the moving body and the guide members, the sizes of the moving body and guide members having shapes suited for holding the bearings have to be increased, and also there are required a plurality of bearings in an attempt to minimize the looseness of the moving body during its movement.

To prevent looseness between the moving body and guide members during the movement of the moving body to thereby provide a smooth movement therefor, the respective bearings should be adjusted. However, considerable difficulty is incurred, because of the complicated shape of the moving body or the guide members. This is particularly true with the case of viewer-copier and the like apparatus for use in microphotography. In other words, upon rapid but accurate movement of a specific frame carrying a desired image thereon to a projection position, the looseness between the moving body and the guide members, or the effect of the failure to provide a smooth movement for the moving body, causes a blur or positional misalignment of a projected image. This necessitates repetitive position-compensating operations to eliminate such defects in the moving body.

Moreover, since there has arisen a tendency to incorporate several hundreds of frames, which carry a great amount of data, in a single sheet of film, there has to be used a projecting lens having a high magnification. Projecting lenses providing such a high magnification enlarge an image with the concomitant effects of the looseness between the moving body and the guide member or with the effect of non-smooth movement of the moving body. Thus, there is an improper projection of an image onto a screen due to the positional misalignment of a desired image, or there is an out-of-focus condition of part or the whole of the projected image every time the moving body is moved. For this reason, a plurality of operations and many man-hours are required for the projection and reproduction of an image, with an accompanying increase in the mental fatigue of the operator.

SUMMARY OF THE INVENTION

It is a principal object of the present invention to provide improvements in carrier apparatus for viewer-copier machines used in microphotography, in which microfilm strips are moved two-dimensionally, with the microfilm held flatwise.

It is another object of the present invention to provide a carrier apparatus which ensures smooth operation.

It is a further object of the present invention to provide a carrier apparatus which is readily adjustable.

The above and other objects of the present invention are readily attained in a carrier apparatus, which comprises guide members having V-grooves defined in the respective two opposing surfaces thereof, and a supporting member provided with two rotary members having their circumferential surfaces which contact the two inclined surfaces of the V-groove in one of the guide members at two points and another rotary member having an outer circumferential surface which contacts the two inclined surfaces of the groove in the other guide member at two points. Smooth movement and ready adjustment are thereby achieved for the carrier apparatus. More particularly a feature of the carrier apparatus according to the present invention is that there are provided guide members having V-grooves in their respective two opposing surfaces and a supporting member provided with two rotary members having outer circumferential surfaces which contact the two inclined surfaces of the groove of one guide member at two points, and one rotary member having an outer circumferential surface which contacts the two inclined surfaces of the groove in another guide member at two points. Further, either the aforesaid guide members or the supporting member is located on the side of a carrier in which microfilm is moved, while held flatwise, and the other of the aforesaid guide members and supporting member is coupled to a carrier supporting member provided on the side of the main body of a microfilm reader.

For a fuller understanding of the nature and objects of the invention, reference should be had to the following detailed description taken in conjunction with the accompanying drawings which indicate various exemplary embodiments of the invention.

BRIEF DESCRIPTION OF THE DRAWINGS

FIG. 1 is a transverse cross-sectional view of a microfilm photographic viewer-copier having a carrier apparatus according to the present invention;

FIG. 2 is a perspective view of the carrier apparatus according to the present invention;

FIG. 3 is a cross-sectional view of the carrier apparatus according to the present invention, taken along the line I—I of FIG. 2;

FIG. 4 is a cross-sectional view taken along the line II—II of FIG. 3;

FIG. 5 is a cross-sectional view taken along the line III—III of FIG. 4;

FIG. 6 is an enlarged cross-sectional view illustrating the relationship between the guide rails and rollers of FIG. 5;

FIG. 7 is a cross-sectional view taken along the line IV—IV of FIG. 2;

FIG. 8 is a cross-sectional view taken along the line V—V of FIG. 7;

FIG. 9 is another embodiment of the carrier apparatus according to the present invention; and FIG. 10 is still another embodiment of the carrier apparatus according to the present invention.

DESCRIPTION OF THE PREFERRED EMBODIMENTS

Referring to FIG. 1, within the housing of microfilm viewer-copier 1 are illuminating section 3 adapted to illuminate microfilm 2 of the sheet form type, carrier apparatus 4 which is movable with film 2 held flatwise, projecting lens 5 adapted to project an image recorded on film 2, and mirrors 6, 7, 8 adapted to reflect an enlarged image onto screen 9. The microfilm viewer-copier further includes sensitive sheet 10, sheet feeding section 11, charging section 12, exposure section 13, and developing section 14. At the time of reproduction, exposure is effected by rotating mirror 8 to project an image recorded on film 2 onto sensitive sheet 10 positioned in exposure section 13.

The reproduction of a film image onto sensitive sheet 10 may be carried out in the usual manner, but for the particular construction of the viewer-copier utilized herein, reference may be made to U.S. Pat. No. 3,856,397, assigned to the same Assignee, which describes the copying operation in detail. The carrier apparatus in accordance with the present invention may be employed in the viewer apparatus without the copying function.

In FIGS. 2 and 3, carrier apparatus 4 is provided with carrier 15, which consists of lower glass support 16, on which film 2 is placed, and pressing-glass support 17 adapted to hold film 2 flatwise in cooperation with lower glass support 16. Glass receiving plate 18 supports lower glass support 16 thereon, with grip 19 provided on glass receiving plate 18. Grip 19 is adapted to move carrier 15. Provided on the opposite edges of pressing-glass support 17 are stop member 20 to limit the position of pressing-glass support 17 relative to lower glass support 16, and cams 21 to open pressing-glass support 17 when film 2 is to be inserted or discharged from carrier 15.

Bonded to the undersurface of glass receiving plate 18 at each edge thereof are slide bars 22 and brake pad 23, both of which are mounted on carrier receiving rod 24. Also provided on the other edge of glass receiving plate 18 is roller holding plate 27 for supporting thereon three rollers 26 which are guided by a pair of guide rails 25, as shown in FIG. 7. The above described structure of carrier 15 enables movement in the Y direction as shown in FIG. 2. Brake pad 23 brakes carrier 15 in a satisfactory manner, without impairing the smooth movement thereof and pad 23 is made, for instance, of a synthetic leather bonded to polyurethane, with the surface of the synthetic leather serving as a braking surface.

Carrier receiving rod 24 and guide rails 25, extending in the Y direction, form carrier supporting frame 30 along with carrier receiving plates 28, 29. Provided on carrier receiving plate 28 is roller holding plate 33 which holds rollers 32 which are guided by a pair of guide rails 31 extending in the X direction as shown in FIG. 2. Bonded to the undersurface of carrier receiving plate 29 are a brake pad (not shown) and slide bar 34, both of which are mounted on carrier receiving rod 35. Thus, carrier supporting member 30 is movable in the X direction. Supporting mount 36 retains guide rails 31 and carrier receiving rod 35 is mounted to housing 1 of a printer, thereby guiding carrier supporting member 30 in the X direction. Shown at 37, 38 are covers for carrier receiving rod 24 and guide rails 25 extending in the Y direction.

Referring to FIGS. 4, 5 and 6, a pair of guide rails 31 extending in the X direction are formed with V-grooves 31a in their respective opposing surfaces, while two rollers 32 contact the two inclined surfaces $31a_1$, $31a_2$ of the V-groove 31a in one guide rail 31 at two points at the corner edges of the rollers 32, thereby presenting a point contact support. Further, another roller 32 contacts the two inclined surfaces $31a_1$, $31a_2$ of a V-shaped groove 31a of the other guide rail 31 at two points at the corner edges of roller 32, thus presenting another point contact support. Rollers 32 are held on roller holding plate 33. When roller holding plate 33 is moved, then roller 32 rolls in contact with V-shaped groove 31a of guide rail 31, so that roller holding plate 33 may move in the X direction without any loose movement between plate 33 and guide rail 31.

As shown in FIGS. 7 and 8, a pair of guide rails 25 extending in the Y direction are formed with V-shaped grooves 25a, while two rollers 26 each contact two inclined surfaces $25a_1$, $25a_2$ of the V-shaped grooves 25a in guide rails 25 at two points at the corner edges of rollers 26, while another roller 26 contacts two inclined surfaces $25a_1$, $25a_2$ of the V-shaped groove 25a of the other guide rail 25 at two points at the corner edges of roller 26, presenting point contact supports. Rollers 26 are retained by roller holding plate 27. When roller holding plate 27 is moved, rollers 26 roll in contact with V-shaped grooves 25a of guide rails 25, so that roller holding plate 27 may move in the Y direction, without any loose movement between plate 27 and guide rails 25. Rollers 26, 32 consist of bearings and the like. However, if rollers 26, 32 are to roll smoothly, it is preferable that their outer circumferential surfaces are chamfered. Provided in the opposite end portions of guide rails 25, 31, respectively, are bolts 39, 39' adapted to adjust the respective spacing between rails 25 and 31, at their ends, and cushions 40, 40' adapted to absorb any shock incurred when stopping the movements of rollers 26, 32.

In the operation of the carrier apparatus according to the present invention, pressing-glass support 17 is pivotally moved about cam 21 so as to be opened, and then microfilm 2 is placed on lower glass support 16. Thereafter, pressing-glass support 17 is closed again to hold microfilm 2 flatwise between the two glass supports 16 and 17. Then, grip 19 is manually moved to shift microfilm 2 which is held on carrier 15 into a projecting position for projecting lens 5. When grip 19 is moved in the Y direction, carrier 15 is guided along the pair of guide rails 25, with the aid of the three rollers 26 which are retained by roller holding plate 27 integral with glass receiving plate 18. Carrier 15 undergoes the braking action of braking pad 23 secured to the undersurface of glass receiving plate 18, when moving in the Y direction. Moreover, when grip 19 is moved in the X direction, a force applied thereto is transmitted through roller holding plate 27 and rollers 26 to the pair of guide rails 25. That force is then transmitted, in turn, to carrier supporting member 30 consisting of guide rails 25, then to carrier receiving plate 28 and roller holding plate 33. Roller holding plate 33 is guided by the pair of guide rails 31, with the aid of three rollers 32 which are held by roller holding plate 33. Carrier 15 is moved thereby in the X direction, undergoing the braking action of the brake pad bonded to the undersurface of the carrier receiving plate 29 of the carrier supporting member 28.

When the grip 19 is further moved in the X and Y directions, then carrier 15 simultaneously effects the movements both in the X and Y directions. In connection with the movement of carrier 15 in the X and Y directions, the axial movements of rollers 26, 32 are limited by their corner edges which contact the respective two inclined surfaces $25a_1$ and $25a_2$, and $31a_1$ and $31a_2$ of the respective V-shaped grooves $25a$, $31a$ of a pair of guide rails 25, 31. Concurrently, the movement of the rollers 26, 32 in the direction at a right angle to the axial direction thereof are limited due to their inward contact with a pair of guide rails 25, 31. This eliminates any loose movement between roller holding plates 27, 33 holding the rollers 26, 32 thereon, and the guide rails 25, 31. Additionally, since rollers 26, 32 roll in point-contacting relation to one of guide rails 25, 31, there results a smooth rolling of the rollers 26, 32, so that roller holding plates 27, 33 move smoothly, being guided by guide rails 25, 31.

Roller holding plate 27 is mounted on glass receiving plate 18, and roller holding plate 33 is mounted on carrier supporting member 30. Thus, carrier 15 is firmly and securely mounted, thus ensuring smooth movement, so that a desired frame of microfilm 2 may be projected rapidly on a screen, but without blur in the projected image. In addition, the smooth movement of carrier 15 facilitates the operation of bringing a desired frame of a film into its projecting position as well as compensating for the positional misalignment of an image.

Moreover, due to the absence of loose movement during the travel of carrier 15, there may be achieved a properly focused image, even if carrier 15 is moved to any position. Upon adjustment to eliminate any loose movement of carrier 15, the spacings between the guide rails at their ends are adjusted by using bolts 39, with either a pair of guide rails 25 or rails 31 taken as a reference for adjustment, which is facilitated because of the use of three rollers 26 and 32. Thus, such adjustment may be accomplished in a quite simple manner.

Description has been given thus far of the case where the guide rails extending in the X and Y directions are stationary relative to the rollers. However, the guide rails may be provided on the side of the carrier in a movable manner for achieving the same results.

FIG. 9 shows a cross-sectional view, in which there are used a single guide rail 41 and three rollers 42, in contrast to the case where there are provided a pair of guide rails 31 and three rollers 32, as shown in FIG. 5. Guide rail 41 is secured to the housing (not shown) by supporting mount 43, and is formed with V-shaped grooves $41a$ in the opposing surface of guide rail 41. Two rollers 42 contact two inclined surfaces $41a_1$, $41a_2$ of V-shaped groove $41a$ at two points at the corner edges of rollers 42, while one roller 42 rotatably contacts two surfaces $41a_1$, $41a_2$ of the other V-shaped groove $41a$ at two points at the corner edges of roller 42, thereby presenting a point-contact support. The three rollers 42 are retained on roller holding plate 44 which is coupled to carrier receiving plate 28 of FIG. 3 or glass receiving plate 18 of FIG. 8, so that it is built into the carrier mechanism.

When roller holding plate 44 is moved in the direction perpendicular to the surface of FIG. 9, then the three rollers 42 will move integrally, being retained by roller holding plate 44. When rollers 42 rotate, the axial movement thereof is limited by the two corner edges thereof which contact the two inclined surfaces $41a_1$, $41a_2$ of V-groove $41a$ in guide rail 41 at two points. Concurrently, the movements of rollers 42 in the direction perpendicular to the axis of rollers 42 is limited due to their holding guide rails 41 therebetween from above and below. This eliminates any looseness between roller holding plate 44 and guide rail 41 through rollers 42, thus ensuring smooth movement of roller holding plate 44.

In the embodiment of FIG. 9 rollers 42 are mounted on roller holding plate 49, and guide rail 41 is mounted on supporting mount 43. Conversely, guide rail 41 may be mounted on roller holding plate 44, and rollers 42 may be mounted on supporting mount 43 for achieving the same results. FIG. 10 shows a cross-sectional view, wherein there are provided single guide rail 45 and three rollers 46, in contrast to the embodiment of FIG. 5 wherein there are provided a pair of guide rails 31 and three rollers 32.

Rollers 46 is supported by roller holding plate 47, and guiding rail 45 is supported on supporting mount 48. Rollers 46 are formed with V-shaped grooves $46a$ in their outer circumferential surfaces, which grooves contact the corners of guide rail 45 at two points on the two inclined surfaces $46a_1$, $46a_2$ of rollers 46, thus presenting a point-contact support. Roller holding plate 47 is coupled to carrier receiving plate 28 of FIG. 3 or glass receiving plate 18 of FIG. 8, so it is built into the carrier mechanism.

When roller holding plate 47 is moved in the direction perpendicular to the surface of FIG. 10, then three rollers 46 retained by roller holding plate 47 will rotatingly move. In the aforesaid movements, the axial movement of rollers 46 is limited by the two inclined surfaces $46a_1$, $46a_2$ of V-shaped grooves $46a$ in rollers 46, which surfaces contact the corners of guide rail 45. The movement of rollers 46 in the direction perpendicular to the axis of rollers 46 is limited due to the three rollers retaining guide rail 45 therebetween from above and below. This eliminates the looseness between roller holding plate 47 and guide rail 45 through the medium of the rollers 46, thus ensuring smooth movement of roller holding plate 47. Rollers 46 are mounted on roller holding plate 47, and guide rail 45 is mounted on supporting mount 48. Conversely, guide rail 45 may be mounted on roller holding plate 47, and rollers 46 may be mounted on support 48, achieving the same results.

While there have been described and illustrated preferred embodiments of the present invention, it is apparent that numerous alterations, omissions and additions may be made without departing from the spirit thereof.

What is claimed is:

1. In apparatus wherein microfilm sheets are positioned for projecting images thereon for either viewing or copying, carrier apparatus for retaining said sheet-like microfilm, comprising:

a movably mounted carrier for retaining the microfilm in a flatwise position thereon to align a specific frame at a projection station;

means for moving said carrier in combined first and second orthogonal directions;

a housing;

first and second means for respectively supporting said carrier to said housing to be movable in said first and second orthogonal directions and each said first and second means including a support rod and a support member including a pair of spaced guide members and movable means mounted therebetween in contacting relationship therewith, said support rod and said pair of spaced guide members being respectively mounted in spaced relation along said first and second orthogonal directions, each of said pairs of guide members including a V-shaped groove and said movable means mounted between said members including a plurality of rollers mounted in point contacting relationship in said V-shaped groove;

means for slidably mounting said second means to said first means and including a pair of spaced carrier members extending along one of said orthogonal directions, said support rod and movable means of said second means for supporting being mounted between said spaced carrier members and to said movable carrier, respectively, one of said pair of spaced carrier members including a slide bar slidably riding upon said support rod of said first means for supporting, and the other of said pair of spaced carrier members including means for mounting said movable means of said first means for supporting;

means for adjusting the spacing between each of said spaced pair of guide members for altering the contacting relationship with each of said movable means for mounting therebetween, and including adjustable bolt members extending between said spaced pair of guide members at each end thereof, said adjustable bolt members each including means for stopping the movement of said first and second support means;

means for braking the movement of said carrier and including brake means mounted between said carrier and its associated support rod and additional brake means between said means for slidably mounting and the other of said support rods;

first sliding members mounted between said carrier and its associated support rod and second sliding members mounted between said means for slidably mounting and the other of said support rods; and each of said pair of guide members and each of said movable means mounted therebetween forming respective point contact supports whereby said carrier may be moved smoothly for accurate positioning of said microfilm for the alignment of a specific frame thereon.

2. Carrier apparatus as in claim 1 wherein said brake and additional brake means are friction pads.

3. Carrier apparatus as in claim 1 wherein said friction pads are made of a leather-like material.

4. Apparatus as in claim 1 wherein said means for supporting has one pair of spaced guide members along said first direction and further including a slide bar and another pair of spaced guide members mounted in spaced relation thereto and additional means mounted therebetween in contacting relationship therewith for supporting said carrier along said second direction.

* * * * *